United States Patent [19]

Zweigart et al.

[11] Patent Number: 5,011,213
[45] Date of Patent: Apr. 30, 1991

[54] SWIVEL BEARING FOR A SUN VISOR

[75] Inventors: Gerhard Zweigart; Ferdinand Greiner, both of Aidlingen; Heinz Baumert; Peter Scheiffele, both of Sindelfingen; Manfred Nowak, Solingen, all of Fed. Rep. of Germany

[73] Assignee: Daimler-Benz AG, Fed. Rep. of Germany

[21] Appl. No.: 402,537

[22] Filed: Sep. 5, 1989

[30] Foreign Application Priority Data

Sep. 3, 1988 [DE] Fed. Rep. of Germany ....... 3829976

[51] Int. Cl.$^5$ .............................................. B60J 3/02
[52] U.S. Cl. .............................................. 296/97.13
[58] Field of Search ................... 296/97.9, 97.12, 97.13

[56] References Cited

U.S. PATENT DOCUMENTS

| | | | |
|---|---|---|---|
| 1,573,272 | 2/1926 | Phillips | 296/97.12 X |
| 1,599,183 | 9/1926 | Phillips | 296/97.13 |
| 3,477,678 | 11/1969 | Icke et al. | 296/97.13 X |
| 4,529,157 | 7/1985 | Suman et al. | 296/97.13 X |
| 4,569,552 | 2/1986 | Marks | 296/97.13 |
| 4,756,570 | 7/1988 | Cooper | 296/97.13 |

FOREIGN PATENT DOCUMENTS

| | | | |
|---|---|---|---|
| 470897 | 1/1951 | Canada | 296/97.13 |
| 7529516 | 1/1976 | Fed. Rep. of Germany. | |
| 3804586 | 8/1989 | Fed. Rep. of Germany. | |
| 633398 | 12/1949 | United Kingdom | 296/97.13 |
| 1390555 | 4/1975 | United Kingdom. | |

Primary Examiner—Margaret A. Focarino
Assistant Examiner—Joseph D. Pape
Attorney, Agent, or Firm—Evenson, Wands, Edwards, Lenahan & McKeown

[57] ABSTRACT

A swivel bearing for a vehicle sun visor which can be swivelled about a vertical axis of the vehicle in front of either a front or a side window comprises a bearing bracket which can be fixed in recessed fashion in a recess of a windscreen frame extending transversely above the front window and, in a hollow space, supports swivellably a curved bearing rod for the sun visor body, the hollow space of the bearing bracket being coverable by a covering part which can be mounted on and has a slot-shaped swivel opening for the curved bearing rod.

13 Claims, 1 Drawing Sheet

SWIVEL BEARING FOR A SUN VISOR

BACKGROUND AND SUMMARY OF THE INVENTION

The invention relates to a swivel bearing for a vehicle sun visor which can be swivelled about a vertical axis of the vehicle into a covering position oriented approximately horizontally in its longitudinal extension, in front of either a front or a side window.

German Utility Model 7,529,516 describes a swivel bearing for a sun visor which comprises a curved bearing rod for the sun visor body, which can be swivelled in a bearing bracket fixed to the bodywork. The bearing bracket is screwed to the roof of the vehicle and limits the swivelling range of the su visor by means of a slot-shaped swivel opening. In the case of an impact, this swivel bearing can cause injuries.

DE-PA 3,804,586, which is not a prior publication, describes a sun visor whose body accommodates a curved bearing rod which is fixed swivellably by one end to the bodywork via a hinge joint. This swivel bearing must be fixed to the A-column of the bodywork when the vehicle is a mere shell so that its attachment foot can be covered over for reasons of visual appearance by an interior lining. The hinge joint projecting from the bodywork then protrudes awkwardly into the vehicle interior until the sun visor is attached and may be damaged at this early stage.

GB-A 1,390,555 describes a sun visor whose curved bearing rod can be swivelled about an axis of a hinge joint screwed to the vehicle roof, said axis being oriented approximately in a vertical axis of the vehicle. Here, the sun visor body is fixed to the curved bearing rod so as to extend vertically and can therefore cover only a small lateral part of a side window or a windscreen with its width. However, the virtually arbitrary orientation used here of the hinge joint can only be emPloyed with this horizontally very short sun visor body since a horizontally extended sun visor body would for reasons of space have only a limited ability to swivel even if the hinge joint with its covering extended into the interior.

An object of the invention is to integrate a swivel bearing of a design which is favourable in terms of production into the vehicle bodywork in a visually appealing way.

The object is achieved by providing an arrangement wherein the bearing bracket exhibits a hollow space open towards the vehicle interior, said bearing bracket being fixable in recessed fashion in a recess of a windscreen frame extending transversely above a front vehicle window, and wherein the hollow space of the bearing bracket is coverable by a covering part mountable at the bearing bracket, said covering part having a slot-shaped swivel opening for the curved bearing rod.

By virtue of its division into bearing bracket and covering part, the swivel bearing can be fitted easily into its surroundings and, with its recessed fixing in the windscreen frame, furthermore results in an arrangement within the vehicle interior which prevents injuries in the case of an impact.

The distance of the swivel bearing from the vehicle side wall can now be varied easily by changing the length of the short limb of the curved bearing rod and corresponding enlargement of the hollow space and can thus be adapted to different configurations of the interior.

The hinge joint has a firm support in the bearing bracket and also in the windscreen frame, with the result that it can be designed to take even high stresses.

The visual appearance of the entire swivel bearing is determined exclusively by the design of the cover part, with the result that tolerance and production differences in the hinge joint do not have a negative effect.

Other objects, advantages and novel features of the present invention will become apparent from the following detailed description of the invention when considered in conjunction with the accompanying drawings.

BRIEF DESCRIPTION OF THE DRAWINGS

FIG. 2 shows a cross-section of the swivel bearing from FIG. 1 with the interior lining drawing in.

DETAILED DESCRIPTION OF THE DRAWINGS

Figure 1:
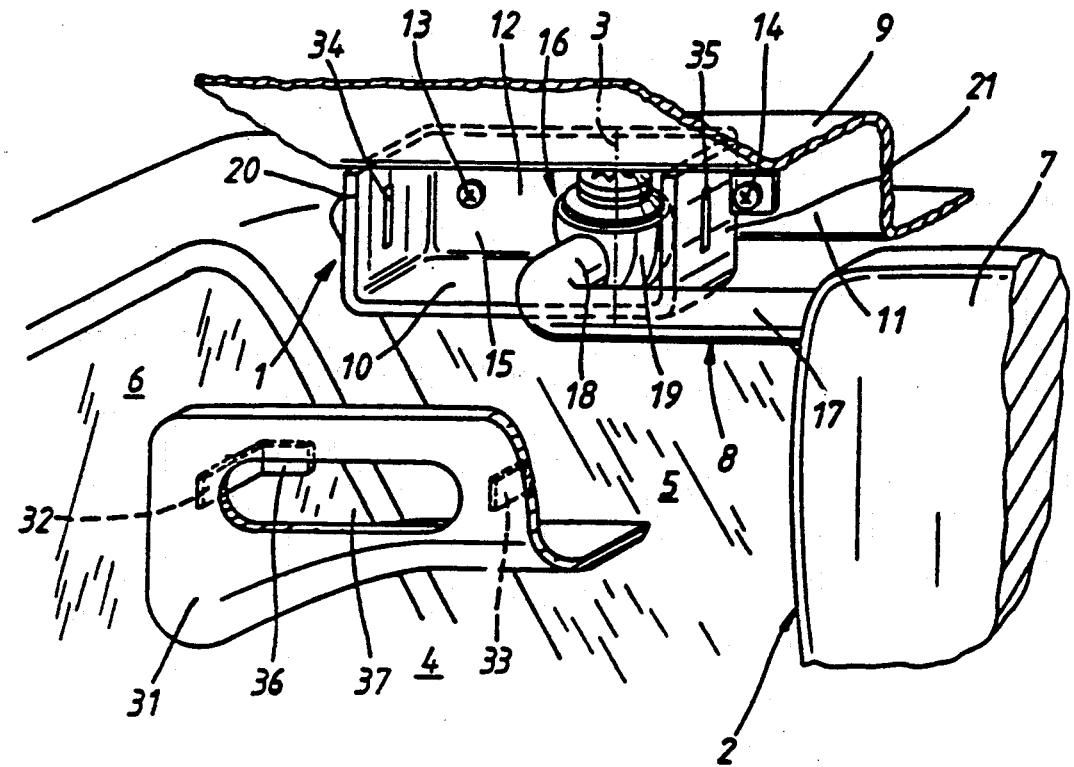
FIG. 1 shows, in an oblique schematic view, a swivel bearing according to the invention, for a sun visor with a covering part placed spatially in front of it.

FIG. 1 shows a swivel bearing 1 for a motor vehicle sun visor 2 which can be swivelled about a vertical axis 3 of the vehicle in a vehicle interior 4 in front of either a front window 5 or a side window 6 For this purpose, a sun visor body 7 accommodates a curved bearing rod 8 which is fixed swivellably by its protruding end to a windscreen frame 9 extending transversely above the front window 5 via the swivel bearing 1.

The swivel bearing 1 comprises a bearing bracket 10 which is screwed by its rear wall 12 to the windscreen frame 9 near to the side window 6 in two fastening points 13, 14 in a recess 11 formed by a bending of the frame profile. By this recessed fixing of the bearing bracket 10 in the windscreen frame 9, said bracket does not form a component protruding into the vehicle interior, which could lead to injuries in the case of an impact.

The bearing bracket 10 is designed as a hollow body which accommodates, in a hollow space 15 provided with an opening towards the vehicle interior, a hinge joint 16 via which the curved bearing rod 8 is swivellably mounted.

The curved bearing rod 8 is of L-shaped design and reaches with a long limb or leg 17 into the sun visor body 7 while it is fixed by its short limb or leg 18 to a bush 19 of the hinge joint 16. In this arrangement, the curved bearing rod 8 is dimensioned and mounted in the bearing bracket 10 in such a way that the short leg 18 can be swivelled into the hollow space 15 of the bearing bracket 10 and then lies with the long leg 17 oriented along the side window 6. At the same time, as desired, this swivelling movement of the curved bearing rod 8 can be limited by abutment of its legs 17 and 18 against the edges of opening 37 of covering part 31, described below. In alternate non-illustrated embodiments, the side walls 20, 21 of the bearing bracket 10 can serve as limit stops for legs 17 and 18.

Figure 2:
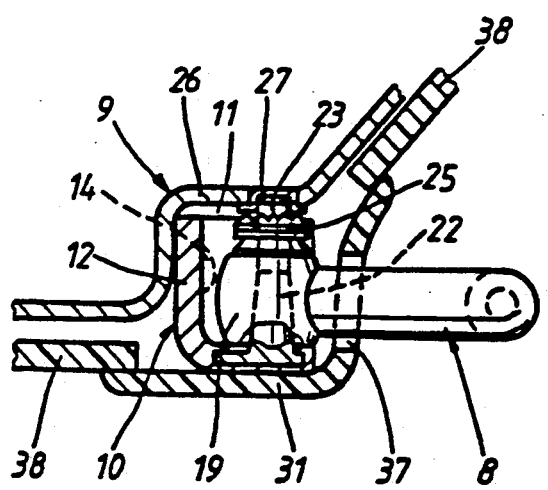
Figure 3:
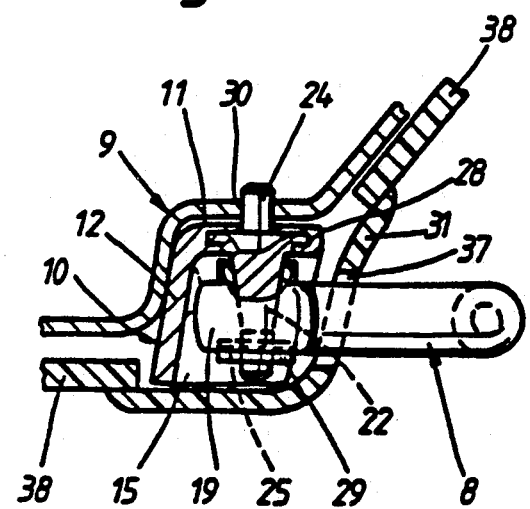
FIG. 3 shows a corresponding cross-section of a further swivel bearing.

As is more clearly visible in FIGS. 2 and 3, the bush 19 of the hinge joint 16 is rotatably mounted on a retention pin 22 which is fixed in the bearing bracket 10 and is additionally supported by one end 23 or 24 in the windscreen frame 9. The swivelling moment of the bush 19 and hence the operating force for the sun visor body 7 can be adjusted by varying an arrangement of cup spring or Belleville washers 25 on the retention pin 22 in a manner known per se.

In FIG. 2, the bearing bracket 10 forms with a recess wall 26 a U-shaped cross-section in which the retention pin 22 is fixed by one end region in the bearing bracket 10 and by its other end 23 in a seat 27 of the windscreen frame 9. An arrangement of cup spring or Belleville washers 25 brakes the free rotation of the bush 19 on the retention pin 22. These cup springs or Belleville washers 25 are tensioned by the screwing tight of the bearing bracket 10 on the windscreen frame 9. The fastening points 13, 14 of the bearing bracket 10 are accessible even when the curved bearing rod 8 is mounted in the bearing bracket 10.

In FIG. 3, the bearing bracket 10 is fitted in cross-section with two walls 12 and 28 respectively into the recess 11 and the bush 19 is held on the retention pin 22, which is fixed in the bearing bracket 10 and is additionally supported by one end 24 in a bore 30 of the windscreen frame 9, by a securing ring 29 which tensions, the cup spring or Belleville washers 25 braking the free rotation of the bush 19.

The hollow space 15 of the bearing bracket 10, which is open towards the vehicle interior 4, is covered by a covering part 31 which can be clipped into slots 34, 35 in the bearing bracket 10 by means of lateral clips 32, 33 and, with a clip prolongation 36, also covers the fastening point 13 in the hollow space 15. This covering part 31 has a slot-shaped swivel opening 37 for the curved bearing rod 8, which reaches through the latter, and forms a harmonious transition to an interior lining 38 of the windscreen frame 9.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Swivel bearing for a vehicle sun visor, which sun visor can be swivelled about a vertical axis of the vehicle into a covering position oriented approximately horizontally in its longitudinal extension, in front of either a front or a side window, which bearing has a curved bearing rod which is accommodated in a sun visor body of the sun visor and is swivellably mounted in a bearing bracket fixed to a vehicle windscreen frame extending transversely about a front vehicle window, wherein the bearing bracket exhibits a hollow space open towards the vehicle interior, said bearing bracket being fixable in recessed fashion in a recess of the windscreen frame, and wherein the hollow space of the bearing bracket is covered by a covering part mounted at the bearing bracket, said covering part having a slot-shaped swivel opening for the curved bearing rod.

2. Swivel bearing according to claim 1, wherein the curved bearing rod is of L-shaped design with a short leg and a long leg, said bearing rod being mounted by its long leg in the sun visor body and by the end of its short leg in the bearing bracket in such a way that the short leg can be swivelled into the hollow space of the bearing bracket, the long leg than being oriented along a side window.

3. Swivel bearing according to claim 1, wherein side walls of the bearing bracket are arranged in such a way that the swivelling movement of the curved bearing rod can be limited by these side walls.

4. Swivel bearing according to claim 1, wherein detachable fastening means are provided for fastening the bearing bracket to the windscreen frame, said fastening means being disposed so as to be accessible even when the curved bearing rod is mounted in the bearing bracket.

5. Swivel bearing according to claim 2, wherein fastening means are provided for fastening the bearing bracket of the windscreen frame, said fastening means being disposed so as to be accessible even when the curved bearing rod is mounted in the bearing bracket.

6. Swivel bearing according to claim 3, wherein fastening means are provided for fastening the bearing bracket of the windscreen frame, said fastening means being disposed so as to be accessible even when the curved bearing rod is mounted in the bearing bracket.

7. Swivel bearing according to claim 1, wherein the bearing includes a hinge joint with a retention pin, said retention pin being mounted in supported fashion in the bearing bracket and in the windscreen frame.

8. Swivel bearing according to claim 1, wherein the bearing includes a retention pin formed integrally with the bearing, which retention pin forms a hinge joint of the bearing.

9. Swivel bearing according to claim 7, wherein the retention pin of the hinge joint is formed integrally with the bearing.

10. Swivel bearing according to claim 1, wherein the swivelling moment of the sun visor body can be adjusted by means of Belleville washers mounted on hinge joint thereof.

11. Swivel bearing according to claim 4, wherein the swivelling moment of the sun visor body can be adjusted by means of Belleville washers mounted on hinge joint thereof.

12. Swivel bearing according to claim 7, wherein the swivelling moment of the sun visor body can be adjusted by means of Belleville washers mounted on hinge joint thereof.

13. Swivel bearing according to claim 1, wherein clip means are provided for clipping the covering part onto the bearing bracket.

* * * * *